United States Patent Office 3,712,814

Patented Jan. 23, 1973

3,712,814

PHOTOGRAPHIC MATERIAL

Erwin Ranz, Harald von Rintelen, Heinz-Dieter Schutz, and Wolfram Neumann, Leverkusen, Germany, assignors to Agfa-Gevaert Aktiengesellschaft, Leverkusen, Germany No Drawing. Filed Dec. 22, 1970, Ser. No. 100,815
Claims priority, application Germany, Jan. 8, 1970, P 20 00 623.9
Int. Cl. G03c *5/00*
U.S. Cl. 96—36 4 Claims

ABSTRACT OF THE DISCLOSURE

Photographic layers containing a compound having the formula:

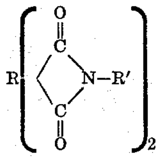

as explained below become less soluble or less swellable upon exposure at the light-struck areas. A relief image is obtained after removal of the unexposed areas.

The invention relates to a process for the production of photographic images and to a light-sensitive material for carrying out the process, which material contains a cyclic aryl polycarboxylic acid imide as light-sensitive compound.

Numerous processes are known in which light-sensitive organic substances are used for producing an image. Some of these processes are based on photochemical rearrangements or reactions of organic compounds resulting in a color change. Such photochemical reactions of organic compounds have been comprehensively described, e.g. in "Präparative organische Photochemie" (A. Schonberg, Springer Verlag 1958) and "Light-Sensitive Systems" (J. Kosar, John Wiley and Sons, New York, 1965).

These reactions include, for example, the formation of monomethine dyes by the photolysis of trihalomethyl compounds in UV light in the presence of aromatic or heterocyclic compounds which by virtue of their constitution have CH ring members which are particularly reactive in condensation or diazo coupling reactions.

The systems previously known are only of limited utility because their sensitivity to light is generally too low.

A certain improvement has already been provided by the light-sensitive materials described in U.S. Pat. No. 3,533,798. The materials contain cyclic imides of aryl polycarboxylic acids whose imide nitrogen is substituted by olefinically unsaturated linear or cyclic aliphataic groups.

The last mentioned photographic processes, however, do not satisfy the practical requirements as regards the sensitivity to light of the materials used.

It is among the objects of the present invention to provide light-sensitive photographic materials which are free from silver halides but which have sufficient sensitivity to light and yield deeply colored photographic images by very rapid and simple processing.

We now have found a photographic material comprising a pigment layer on a transparent or opaque support, which pigment layer contains a pigment whose color provides a very high contrast to the support, a light-sensitive cyclic imide of an aryl polycarboxylic acid being contained either in this pigment layer or in a separate contiguous layer arranged above the pigment layer.

According to a preferred embodiment, the support is white in color or contains a white pigmented layer, e.g. a baryta-coated paper with a very deep blue to black pigmented layer arranged on such a support.

The material described above is processed according to the invention as follows:

The light-sensitive layer is first exposed imagewise, a dark colored image being produced in the exposed areas by photolytic reaction of the aryl polycarboxylic acid imide. The exposed material is then heated to a temperature of between about 80° C. and 250° C. This heat treatment seems to cause further decomposition of the light-sensitive compound or of the intermediate produced on exposure, the layer binder in the exposed parts of the layer being converted into a difficultly soluble form. The material which has been treated in this way is then treated with a solvent for the binder of the layer so that the unexposed parts of the layer, which have remained unchanged, are washed out, the high contrast pigmented or transparent support thus being uncovered in these areas. In the case of a black pigmented light-sensitive layer on a support of baryta paper, for example, a deeply colored negative image of the original is obtained. In the opposite case of a white pigmented light-sensitive layer on a dark support, a positive image of the original is obtained since the colored layer support is uncovered in the unexposed areas.

In some cases it is also possible to heat the light-sensitive layer first to a temperature of between 80 and 250° and to expose imagewise the heated layer. It is, however, preferred first to expose imagewise.

Compounds of the following formula are particularly suitable light-sensitive cyclic aryl polycarboxylic acid imides:

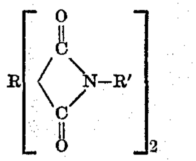

where:

R represents aryl with one or more condensed benzene rings, preferably a group of the benzene or naphthalene series which may be substituted, e.g. with alkyl, especially alkyl containing up to 5 carbon atoms such as methyl, ethyl or propyl, with halogen such as chlorine or bromine, with nitrile or with alkoxy, especially alkoxy containing up to 5 carbon atoms, and the like;

R′ stands for (I) —XZ, (II) hydrogen, (III) a saturated or an olefinically unsaturated aliphatic group preferably containing up to 18 carbon atoms, such as methyl, ethyl, propyl, butyl, pentyl, hexyl, dodecyl or allyl, butenyl or pentenyl, (IV) a saturated or an unsaturated cycloaliphatic radical such as cyclopentyl, cyclopentenyl, cyclohexyl or cyclohexenyl, (V) a dihydropyran radical, in which case the cyclic radicals mentioned above may be connected to the nitrogen atom either directly or via an alkylene bridge, or (VI) a 5-membered or 6-membered ring which contains a cyclopropane group and preferably in addition an endomethylene structure, e.g. a ring of the tricyclene series such as tricyclene or nortricyclene;

X represents (I) a saturated or an olefinically unsaturated aliphatic chain preferably containing up to 5 carbon atoms, which chain may be interrupted by hetero atoms such as oxygen, sulfur, or by

phenylene rings or cycloaliphatic rings, (II) a saturated or an unsaturated cycloaliphatic radical such as divalent cyclopentane or cyclohexane, or (III) a single chemical bond;

Z represents $$-OR^{II},\ -N\begin{matrix}R^{II}\\ R^{III}\end{matrix}$$

or nitrile, $R^{II}$ represents hydrogen or a saturated or an olefinically unsaturated aliphatic group preferably containing up to 5 carbon atoms, in particular methyl or cycloalkyl such as cyclopentyl or cyclohexyl;

$R^{III}$ represents an aliphatic saturated or olefinically unsaturated group preferably containing up to 5 carbon atoms, in particular methyl or cycloalkyl such as cyclopentyl or cyclohexyl;

$R^{II}$ and $R^{III}$ may together represent the ring members required to complete a saturated heterocyclic ring, in particular one of the following rings: azacyclopropane, pyrrolidine, morpholine, thiomorpholine, piperidine or piperazine, these rings, if desired, containing a keto group as in the case of cyclic carboxylic acid imides.

The following are examples of compounds which have proved to be especially suitable:

1.

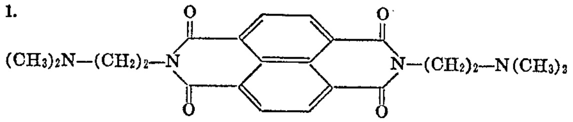

2.

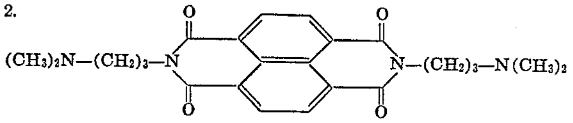

3.

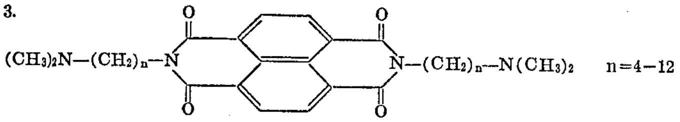

4.

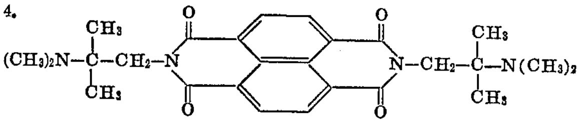

5.

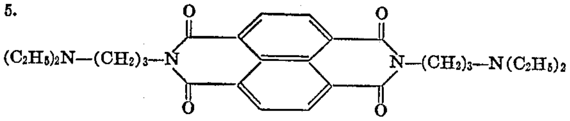

6.

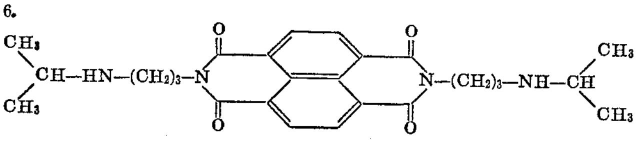

7.

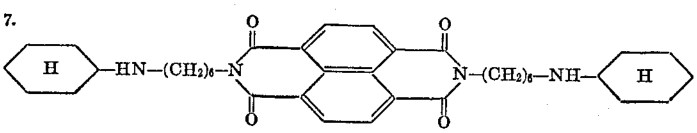

8.

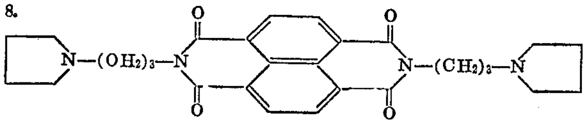

9.

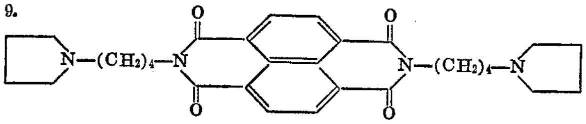

10.

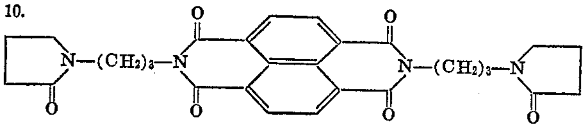

11.

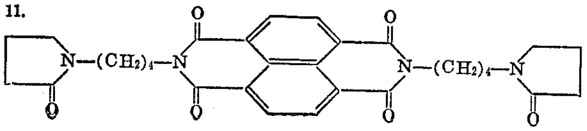

12.
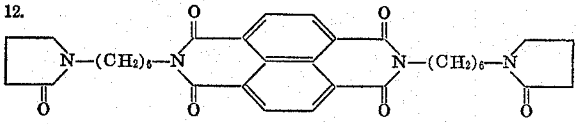
13.
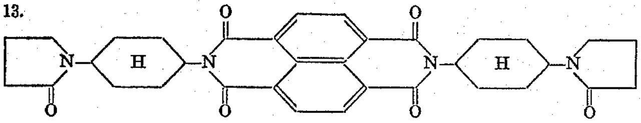
14.
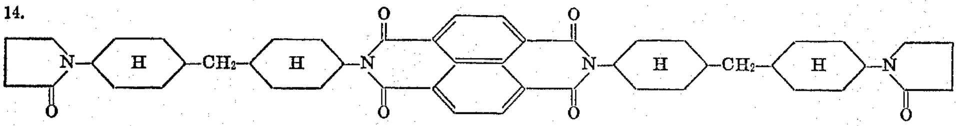
15.
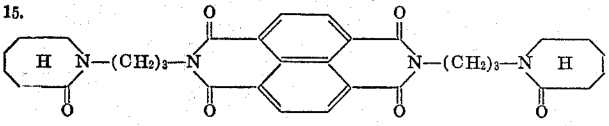
16.
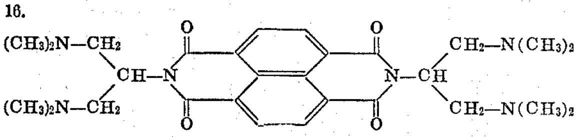
17.
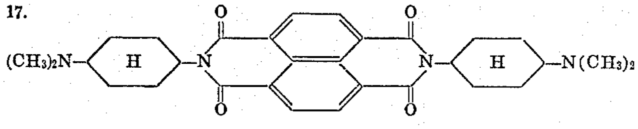
18.
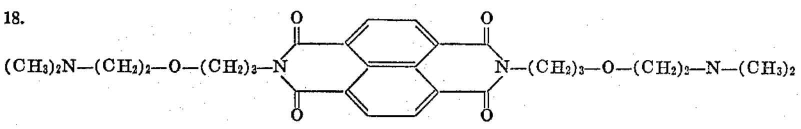
19.
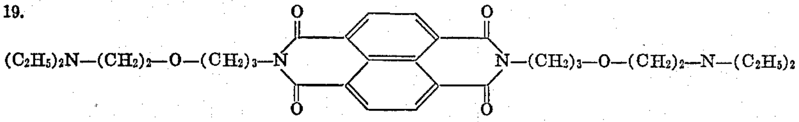
20.
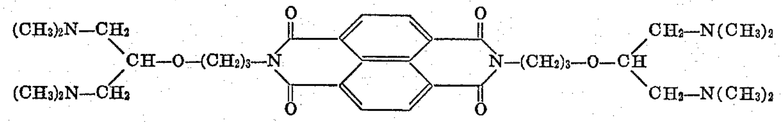
21.
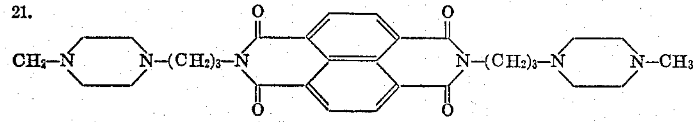
22.
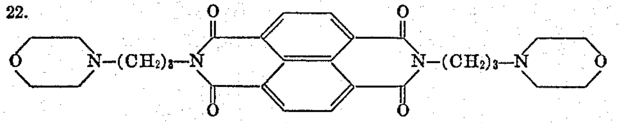
23.
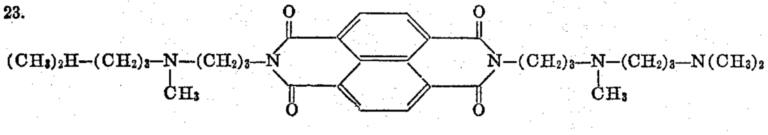
24.
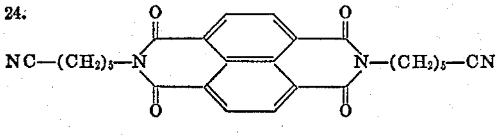

25.
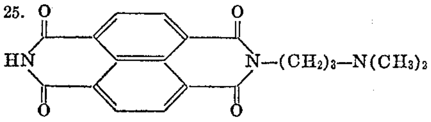
26.
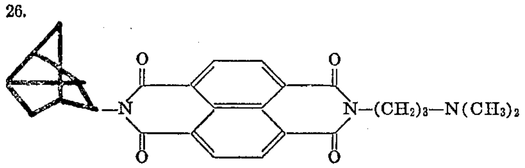
27.
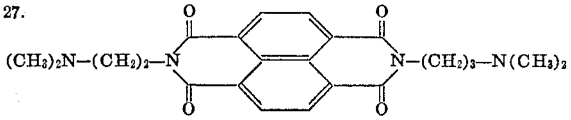
28.
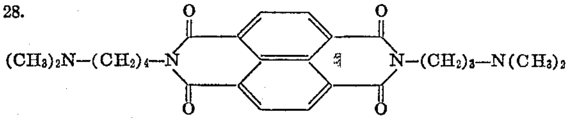
29.
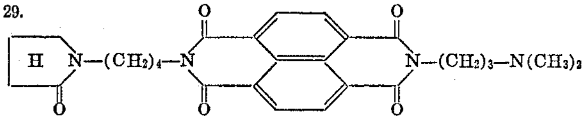
30.
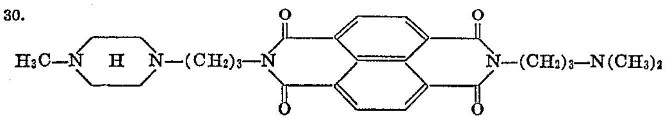
31.
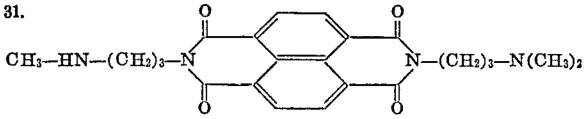
32.
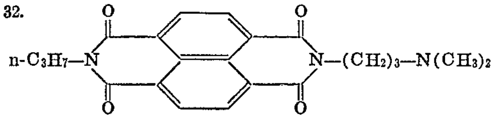
33.
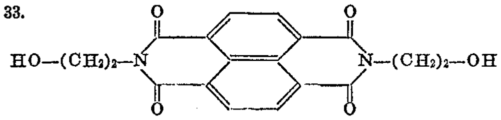
34.
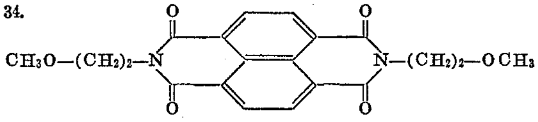
35.
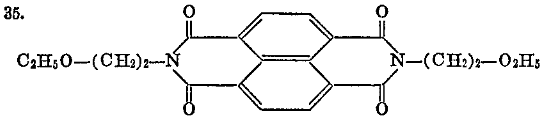
36.
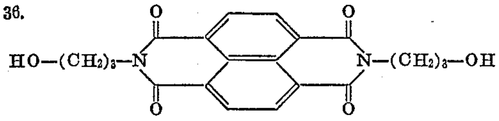
37.
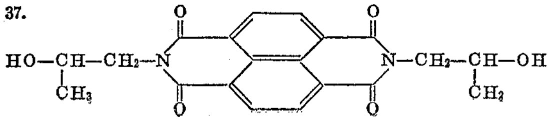

38.
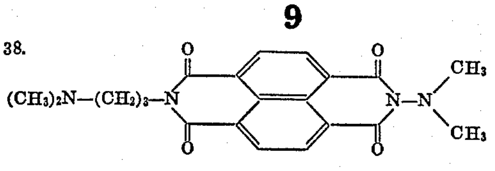
39.
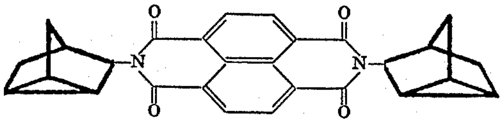
40.
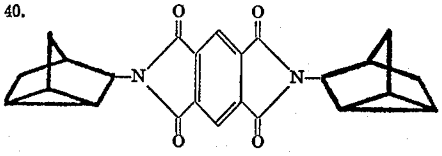
41.
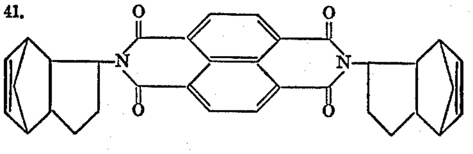
42.
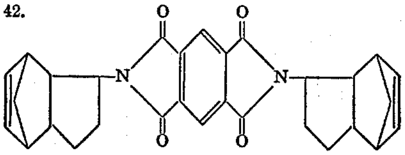
43.
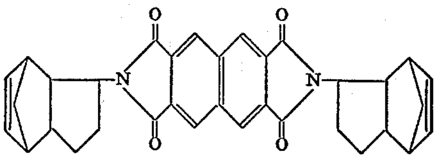
44.
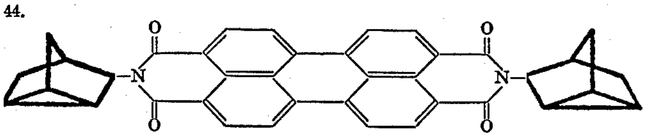
45.
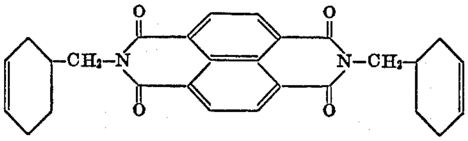
46.
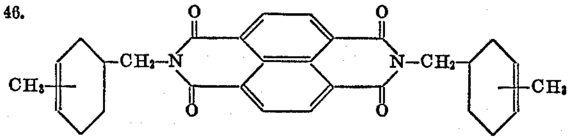
47.
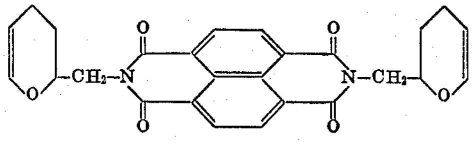
48.
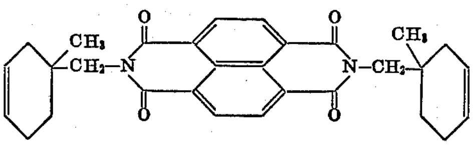
49.
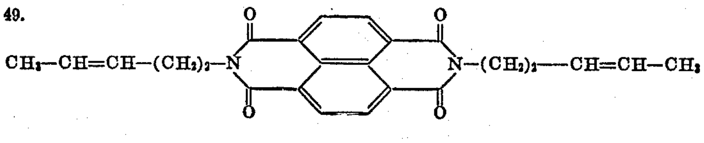

The compounds for use according to the invention may be prepared by various known processes, e.g. by reacting naphthalene-1,4,5,8-tetracarboxylic acid dianhydride or the corresponding naphthalene-1,4,5,8-tetracarboxylic acid with the corresponding amines in the presence of a suitable solvent or in a melt. Solvents such as ethanol, dimethyl formamide or N-methyl pyrrolidone, which take up the water formed in the reaction, may be used; toluene or xylene, by means of which the water of reaction can easily be removed by azeotropic distillation at the boiling point in a water separator, are also suitable solvents. The preparation of basic alkylated naphthalene-1,4,5,8-tetracarboxylic acid diimides has been described, for example, in German Pat. No. 1,195,762.

The preparation of a few representative compounds is described in detail below. The other compounds are prepared in analogous manner.

Compound 2

10.2 parts by weight of 3-amino-1-dimethylaminopropane are dissolved in 150 parts by weight of dimethyl formamide. 13.4 parts by weight of naphthalene-1,4,5,8-tetracarboxylic acid dianhydride are introduced in portions into the solution at room temperature, the temperature rising from 25° C. to 35° C. The reaction mixture is then heated under reflux for 2 hours. When cold, it is filtered and the residue is washed with alcohol. 19.5 parts by weight of pale yellow, crystals of compound 2 are obtained, M.P. 226° C. to 228° C.

The IR spectrum and elementary analysis confirm the postulated structure.

Compound 11

15.6 parts by weight of N-(4-aminobutyl)-pyrrolidone in 150 parts by volume of ethanol are reacted with 13.4 parts by weight of naphthalene-1,4,5,8-tetracarboxylic acid dianhydride by a method analogous to that used for compound 2 to form the diimide. The reaction product is obtained in the form of colourless crystals of melting point 217° C. in a yield of 24.2 parts by weight.

Asymmetrically substituted naphthalene-1,4,5,8-tetracarboxylic acid diimides are prepared by first preparing the mixed anhydride imide (Stage A):

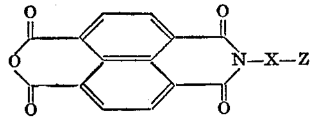

Stage A and then reacting this with a second, suitable substituted amine to form the asymmetrically substituted imide. Stage A may be prepared, for example, by reacting naphthalene-1,4,5,8-tetracarboxylic acid dianhydride in a suitable solvent with the quantity of an amine corresponding only to one anhydride group. Thereafter, the product is reacted with a second amine different from the first to yield the asymmetrically substituted imide, this second reaction being carried out either after isolation of State A or the two reactions being carried out as a single stage process. The preparation of some representative compounds is described in detail below. The other compounds are prepared in a similar manner.

Compound 26

Stage A: 26.8 parts by weight of naphthalene-1,4,5,8-tetracarboxylic acid dianhydride are dissolved in 900 parts by volume of dimethyl formamide with heating, and 10.2 parts by weight of 3-amino-1-dimethylaminopropane are added dropwise at reflux temperature. The reaction mixture is then stirred for 2 hours under reflux. When cold, the reaction mixture is suction-filtered and the residue is washed with 120 parts by volume of alcohol. 18.7 parts by weight of the asymmetric compound:

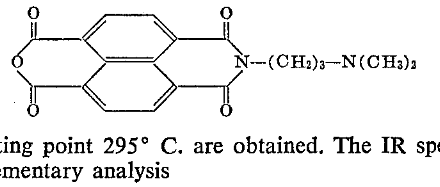

of melting point 295° C. are obtained. The IR spectrum and elementary analysis $$(N_{theoretical}=7.96\%,\ N_{found}=7.9\%)$$

confirm the assumed structure. The substance is slightly light-sensitive.

17.6 parts by weight of the compound described above (Stage A) are reacted with 5.45 parts by weight of nortricyclylamine in 150 parts by volume of dimethyl formamide and heated under reflux for 4 hours. When the reaction mixture is cold, it is suction-filtered and the filter residue is washed with alcohol. 18.2 parts by weight of pale yellow crystals of compound 26 are obtained, M.P. 237° C. to 239° C., its structure is confirmed by the IR spectrum.

Compound 30

Stare A: 30.4 parts by weight of naphthalene-1,4,5,8-tetracarboxylic acid are dissolved in a solution of 200 parts by weight of crystalline sodium acetate and 900 parts by volume of water with heating, and 10.2 parts by weight of 3-amino-1-dimethylaminopropane are added dropwise at 75° C. in the course of 15 minutes. The reaction mixture is then stirred for 10 hours at 75° C. After cooling, the reaction mixture is filtered from a slight ground deposit, then made strongly acid with concentrated hydrochloric acid and boiled for 30 minutes. After cooling with ice, the reaction mixture is suction-filtered and the residue is washed with alcohol and dried. 31.6 parts by weight of the compound:

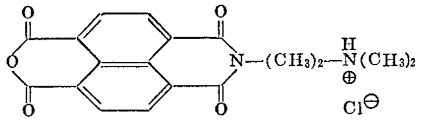

of M.P.=288° C. are obtained.

15.7 parts by weight of N-methyl-N'-3-aminopropyl piperazine are added dropwise at room temperature to 19.4 parts by weight of the compound described above dissolved in 150 parts by volume of dimethyl formamide, the temperature rising from 28° C. to 48° C. The reaction mixture is thereupon heated under reflux for 4 hours, in the course of which the product precipitates. After cooling, the precipitate is isolated by suction-filtration, washed with 80 parts by volume of alcohol and dried. 24.3 parts by weight of pale yellow crystals of compound 30 are isolated, M.P. 210° C. to 213° C., and the structure of the product is confirmed by the IR spectrum and elementary analysis.

The preparations of some other compounds of the above-mentioned table is described in U.S. Pat. No. 3,533,798.

Various binders are suitable for the layers which contain the light-sensitive cyclic aryl polycarboxylic acid imide. Surprisingly, the choice of suitable binders is not limited to polymers which have certain reactive groups or groups which are capable of crosslinking. Indeed, it has not yet been clarified on what effect the process according to the invention is based, i.e. whether crosslinking of the layer binding agent by the products produced on heating in fact occurs or whether the formation of these products merely modifies the wettability of the layers to such an extent that the unexposed parts of the layer remain soluble while the exposed parts become insoluble or incapable of swelling in these solvents.

The wide variety of suitable layer binders is evident from the fact that both water-soluble binders and binders which are soluble in organic solvents such as benzene, acetone, butanol, chloroform, ethyl acetate, etc. are found to be suitable. For the sake of simplicity of processing, it is, of course, preferable to use water-soluble binders, both synthetic and natural film-forming products being suitable, e.g. proteins, especially gelatine, cellulose derivatives such as cellulose ethers or cellulose esters, e.g. methyl- or hydroxyethyl-cellulose, hydroxypropylcellulose, carboxymethyl cellulose or the like, starch or starch derivatives such as starch ethers, alginic acid or derivatives thereof such as salts, especially alkali metal salts, esters or amides, and caragheenates and the like.

Imagewise alteration of the physical properties of the layer is also achieved with synthetic binders such as polyvinyl alcohol, partially saponified polyvinyl acetate, polyvinyl pyrrolidone, saponified copolymers of polyvinyl acetate, e.g. with ethylene, or products which are soluble in organic solvents, such as polyvinyl acetate, copolymers of polyvinyl acetate, e.g. with ethylene, polystyrene or butadiene, or polymers or copolymers of acrylic acid or methacrylic acid.

Preference is given to cellulose ethers which contain short chain hydroxyl alkyl ether radicals and which are soluble in water.

The light-sensitive cyclic aryl polycarboxylic acid imides may be either arranged in a separate layer above the layer which contains pigment or they may be added to this pigment layer. In the first of these two methods, just mentioned, the binder used for the pigment layer may be the same or different from that used for the light-sensitive layer but it is, of course, necessary to ensure that the binders for the pigment layer are soluble in the same solvents as the binders of the light-sensitive layer so that in the unexposed areas both the light-sensitive layer and the pigment layer can be washed out to expose the differently colored support.

According to another embodiment, the light-sensitive aryl polycarboxylic acid imides may be applied to the pigments without using a separate binder.

The usual products are suitable for use as supports, e.g. cellulose esters such as cellulose acetate or cellulose butyrate, polyesters, especially those based on polyethylene glycol terephthalates, or polycarbonates, especially those based on bis-phenylol alkanes, and furthermore, paper supports, especially baryta-coated paper.

The support may be transparent or colored, preferably with colors which form a very high contrast to the pigment layer itself. If the support used comprises a layer containing dye, it is, of course, necessary to ensure that the binder for this layer is substantially different in its physical properties, especially its solubility, from the binder used for the pigment layer in order that the layer of the support may not be damaged in processing. The adherence of the pigment layer or of the light-sensitive layer to the support or to the colored layer of the support is also important; it should not be too firm in order that the unexposed parts of the light-sensitive layer or of the pigment layer can be washed out sufficiently easily. On the other hand, a certain strength of bond is, of course, necessary in order that the layers will not become detached spontaneously. None of these factors provide any serious difficulties. Suitable combinations of layers and binders for these layers can easily be found on the basis of the general technical knowledge in this field.

Furthermore, there are no restrictions from a chemical point of view on the choice of suitable dyes or pigments for the layer support or for the pigment layer itself. As already mentioned above, the pigment in the pigment layer should form a high contrast to the colour of the layer support. This is necessary in order to obtain a high contrast image. The dyes or pigments should, of course, be insoluble in the solvents used in order to avoid migration of the pigment into adjacent layers or parts of layers. It is, of course, necessary to prevent the pigment in the pigment layer from coloring the differently colored layer support in the process of preparing the material because otherwise an interfering background would be found in the parts of the layer support which are exposed when the layer above it is washed out.

The sensitivity of the materials according to the invention extends from the ultraviolet to the visible part of the spectrum. UV lamps, mercury vapour lamps, halogen lamps, electronic flash lamps, etc. are therefore suitable for exposure. The exposure time depends, of course, on the sensitivity of the light-sensitive compound, its distance from the source of light, etc. Exposure times of between 5 seconds and 1 to 2 minutes have generally been found sufficient. For most materials, exposure times of between 5 and 20 seconds are sufficient to obtain a high quality high contrast image.

On exposure, a visible image which can be assessed instantly is immediately formed in the exposed areas. These images either remain visible or disappear spontaneously according to the type of diimide used because the discoloration produced by the effect of light is either reversible or stable according to the type of diimide. The former applies, for example, to cyclic aryl polycarboxylic acid imides whose imide nitrogen is substituted with amino alkyl groups. This reversible formation of an image may be useful for various practical purposes.

After exposure, the material is heated to a temperature of between 80° C. and 250° C., preferably between 120° C. and 200° C. Heating may be carried out in various ways, for example by keeping the exposed material in a heating cupboard or preferably by passing the exposed material between heated rollers. The time required for the heat treatment depends on the effect desired, the nature of the cyclic aryl polycarboxylic acid imide and, of course, on the temperature. Longer times are required at lower temperatures and conversely very short times at elevated temperatures. A few seconds to one minute is generally sufficient. At temperatures of between 130° C. to about 150° C., heating times of between 5 and 10 seconds are sufficient. The sensitivity of the material can also be varied within wide limits by varying the temperature. The higher the temperature to which the exposed material is heated, the greater is the sensitivity, i.e. the lower the intensity of light necessary to achieve sufficient physical differentiation of the layer. Thus, for example, at temperatures of about 200° C., even very slightly exposed parts of the image are altered in their physical properties so that they cannot be washed out. Within the temperature range of 80° C. to 250° C., the sensitivity can be varied by a factor of about 10 to 50 according to the nature of the light-sensitive compound.

After the heat treatment, the unexposed parts of the light-sensitive layer or pigment layer are washed out in a final stage of the process. This can be carried out in the usual manner with the usual apparatus by treating the heat treated material with a suitable solvent. As already mentioned above, water can be used for this if water-soluble layer binders have been used. The time required for washing out the unexposed parts of the layer also depends on the nature of the layer binder, but times ranging from about 5 seconds to 1 minute are generally sufficient.

According to a particular embodiment of the process of the invention, removal of the unexposed parts of the layer can also be achieved by transferring these parts of the layer to a second support. This is carried out by pressing the exposed layer to a second support after the layer has been heated. The two sheets are then separated, the unexposed parts of the light-sensitive layer are torn out and transferred on the second support. If this layer was black or dark in colour, a non-reversed image of the original is immediately obtained on the second support. When this method is used, the bonding properties of the layers must be carefully adjusted to each other; the unexposed parts of the light-sensitive layer must adhere less firmly to its support than to the second layer support. The reverse applies to the exposed parts of the layer. Since these tearing out processes are well known in principle, the average expert can easily find suitable combinations of binders by a few simple tests.

In the process of the invention, exposure may be either with direct light through transparent originals or in the usual way with reflected light in the case of opaque originals.

With suitable choice of components, times of between about 25 seconds and one minute are required for the whole process.

The material according to the invention and the process according to the invention have substantial advantages over known recording processes, especially those employing light-sensitive substances which are free from silver halides.

For those last mentioned materials, that is those that do not contain silver halides, the problem of stabilisation of the image arises because the light-sensitive compounds remain in the unexposed parts of the layer. In the case of silver halide emulsion layers, the silver halides can be removed from these parts of the layer by the usual method of fixing with silver halide solvents. In the case of materials which are free from silver halides, removal of the compound or its conversion into products which are insensitive to light always involves considerable difficulties.

Another advantage is the very high light fastness of the colored images. Since there is practically no restriction in the choice of dyes or pigments, light fast dyes of the type used e.g. for textiles may be used. In addition, one may easily obtain images in a wide variety of colors on any colored background. With the wide choice of known dyes available, any desired combination can be obtained.

Another advantage is that one can obtain either positive or negative copies of the original on the same prniciple according to the color of the support and of the pigment layer. If, for example, a dark pigment layer is used on a white support, a negative, dark image is obtained on a pale background since the dark pigment layer is removed, that is, preferably washed out of the unexposed areas. If, on the other hand, a white pigmented layer is used on a dark support, a positive image is obtained in the same color as the dark layer support since the exposed areas remain white.

An important advantage of the present invention is the high sensitivity of the material. This is achieved firstly by the fact that even a very small quantity of light-sensitive compound will, when decomposed by light, exert a sufficient influence on the physical properties of the layer. Further increase in the sensitivity to light can be achieved by increasing the temperature during the heat treatment.

The images produced by the process of the invention have a very steep gradation and are especially suitable for copying line originals.

When exposure is carried out through screened foils, continuous tone images can also be reproduced.

EXAMPLE 1

Preparation of the light-sensitive material

A solution consisting of:

300 ml. of a 1% aqueous solution of hydroxy propyl cellulose ether, e.g. the product marketed by Hercules Powder under the name Klucel G,
40 ml. of ethyl alcohol,
12 ml. of a 10% aqueous solution of saponin and
60 ml. of a 3% aqueous suspension of a dark blue pigment, e.g. the blue anthraquinone dye marketed by BASF under the name Platinolblau RR is cast on a layer support of baryta paper. The thickness of the layer when dry is 5 μm. A layer of compound 26 which is free from binder and which contains about 500 mg. of substance per m.$^2$ is applied to the dry pigment layer from a 0.45% solution in methylene chloride.

Processing (a) The light-sensitive material is exposed for 5 seconds to a UV lamp (Osram HQA 400 Watt kmZ.) at a distance of 20 cm. through a transparent original and then heated to 200 C. for 30 seconds. The layer is then passed through sponge rollers which have been moistened with water (treatment time about 20 seconds). This washes out the unexposed parts of the layer and exposes the white pigmented support underneath. A deep blue image on a white background is obtained.

(b) Light is reflected from a black and white line original. The exposure time is 40 to 50 seconds, using a UV lamp (Osram HQA 400 Watt kmZ.) at a distance of 20 cm. The material is then treated as indicated above. A laterally reversed negative image of the original is obtained (white letters on blue background).

EXAMPLE 2

Preparation of the light-sensitive layer

A solution consisting of:

30 ml. of a 2% solution of cellulose methyl ether in ethyl alcohol,
100 ml. of ethyl alcohol, 1.0 g. of Compound 12 dissolved in 10 ml. of chloroform, 60 ml. of a 1% solution in water of the above cellulose ether,
6 ml. of a 10% aqueous solution of sponin and
2 ml. of a pigment paste (22%) by weight of dye) of a black pigment, e.g. the product marketed by Ciba AG under the name Microsolschwarz B2 is cast on a layer support of baryta paper. When dry, the layer contains 700 mg. of the light-sensitive compound per m.$^2$.

Processing (a) The material is exposed for one minute through a transparent original to a UV lamp (Osram HQA 400 Watt kmZ.) at a distance of 20 cm. and passed over a roller heated to 150° C. for 8 seconds.

The unexposed parts of the layer are then washed out as described in Example 1. A deep black image of the original is obtained on a white background.

A substantial increase in the sensitivity to light is obtained by increasing the temperature employed during the heat treatment of the exposed material. If, for example, another sample of the material mentioned above that has been exposed in the same way is also heated for 8 seconds but to a temperature of 200° C., an exposure time of only 4 seconds is required under the same conditions of exposure to obtain an equally good image of the original.

(b) Transfer process: A strip of the light-sensitive material described above is exposed for 10 seconds through a transparent original to a UV lamp (Osram HQA 400 Watt kmZ.) at a distance of 20 cm. and then heated at 200° C. for 30 seconds. The layer is then passed through a pair of rollers together with a moist sheet of writing paper. The usual apparatus for the production of copies by the silver salt diffusion process, for example, may be used for this purpose.

By pressing together the exposed, heated material and the moist sheet of receiving material, the unexposed parts of the light-sensitive layer, which are colored with a black pigment, are transferred to the receiving sheet. On separation of the two sheets, these parts of the layer are torn out of the light-sensitive layers so that a positive relief image of the original is obtained in a deep black colour on the receiving sheet.

EXAMPLE 3

The light-sensitive layer has the same composition as in Example 2 but the casting solution for this layer is cast on a transparent support of a polyester based on polyethylene terephthalate.

Processing

The material is exposed for one minute through a transparent original to a UV lamp (Osram HQA 400 Watt kmZ.) at a distance of 20 cm., and the exposed sheet is then passed over a roller heated to 130° C., the contact time with the roller being 20 seconds. The unexposed parts of the layer are then washed out. A black image on a transparent support is obtained.

According to densitometric measurements using a conventional densitometer, the maximum density obtained is 0.92, the uniformly distributed basic fog is 0.1.

EXAMPLE 4

A solution consisting of:

300 ml. of 1% aqueous solution of hydroxy propyl cellulose ether, e.g. the product marketed by Hercules Powder under the name Klucel G,
10 ml. of a 10% aqueous solution of saponin and
50 ml. of 20% aqueous suspension of $TiO_2$ was cast on a layer support of paper. The paper support had a black pigmented layer instead of a baryta layer. After drying, a layer of 500 mg. of Compound 11 was applied to the $TiO_2$ layer from a 0.5% solution in methylene chloride.

Processing

The material was exposed once to the light of a flashgun through a transparent original (exposure time $10^{-3}$ second).

As a result of imagewise reversible conversion of the aryl polycarboxlic acid imide, a dark grey negative image of the original on the white background of the $TiO_2$-containing layer is first obtained. This can be used to assess whether the image obtained contains the required information with sufficient clarity. If this is not the case, the image will fade by simply leaving it lying. The coloured compound spontaneously changes back into the colourless light-sensitive compound. This process can be speeded up by heating to a temperature below that which causes the conversion to the difficultly soluble images, e.g. to a temperature of 90° C. In that case, only about 10 to 20 seconds is required for fading of the image.

If the image is satisfactory, processing of the exposed sheet can be continued at once after only a brief inspection. Alternatively, the sheet may be exposed again through the same transparent original and then processed as in the other examples.

A white image on a black background is obtained.

We claim:

1. A process for the production of photographic images, which process includes the steps of:

(a) imagewise exposing a layer of light-sensitive aryl polycarboxylic acid imide in effective contact with a binding agent that anchors a pigment stratum on a support but can be softened to non-anchoring condition except where the imide is light struck and heated, the imide having the formula:

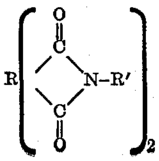

wherein

R=aryl with one or more condensed benzene rings;

R'=(I) —XZ, (II) hydrogen (III) a saturated or an olefinically unsaturated alipatic group, (IV) a saturated or an unsaturated cycloaliphatic radical, (V) a dihydropyran radical, the above cyclic radicals being attached to the nitrogen atom either directly or via an alkylene bridge, or (VI) a 5-membered or 6-membered ring which has a cyclopropane group;

X=(I) a saturated or olefinically unsaturated aliphatic chain which may be interrupted by hetero atoms, phenylene rings cycloaliphatic rings, (II) a saturated or unsaturated cycloaliphatic radical or (III) a single chemical bond;

Z=$-OR^{II}$, $$-N\begin{matrix} R^{II} \\ R^{III} \end{matrix}$$

or nitrile;

$R^{II}$=hydrogen, a saturated or olefinically unsaturated aliphatic group or cycloalkyl;

$R^{III}$=an aliphatic saturated or olefinically unsaturated group or cycloalkyl; and $R^{II}$ and $R^{III}$ may together represent the ring members required for completing a saturated heterocyclic ring, which ring may contain a keto group;

(b) heating the exposed layer to a temperature of between 80° C. and 250° C. and (c) softening and removing the pigment stratum at the unexposed portion of the light-sensitive layer.

2. The process of claim 1 in which the pigment has a color that contrasts with the support.

3. The process of claim 1 in which the binder is water-soluble and the softening is effected with water.

4. The process of claim 1 in which the softening is effected with a transfer sheet pressed against the light-sensitive layer to cause the softened portion to be transferred to the transfer sheet.

References Cited

UNITED STATES PATENTS

| | | | |
|---|---|---|---|
| 3,362,824 | 1/1968 | Verelst | 96—36 |
| 3,574,617 | 4/1971 | Skoultchi | 96—36 |
| 3,586,554 | 6/1971 | Couture et al. | 96—36 |

J. TRAVIS BROWN, Primary Examiner

E. C. KIMLIN, Assistant Examiner

U.S. Cl. X.R.

96—35.1, 90